US009941517B2

(12) United States Patent
Shigematsu et al.

(10) Patent No.: US 9,941,517 B2
(45) Date of Patent: Apr. 10, 2018

(54) ELECTRODE FOR LITHIUM BATTERY AND PRODUCTION PROCESS THEREOF, AND LITHIUM BATTERY

(71) Applicants: Mitsui Chemicals, Inc., Minato-ku, Tokyo (JP); Industrial Technology Research Institute, Chutung, Hsinchu (TW)

(72) Inventors: Akihito Shigematsu, Ichihara (JP); Gen Miyata, Ichihara (JP); Jung-Mu Hsu, Hsinchu (TW); Chang-Rung Yang, Hsinchu (TW); Jing-Pin Pan, Hsinchu (TW)

(73) Assignees: MITSUI CHEMICALS, INC., Tokyo (JP); INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 14/764,902

(22) PCT Filed: Jan. 28, 2014

(86) PCT No.: PCT/JP2014/051795
§ 371 (c)(1),
(2) Date: Jul. 30, 2015

(87) PCT Pub. No.: WO2014/119554
PCT Pub. Date: Aug. 7, 2014

(65) Prior Publication Data
US 2015/0372307 A1    Dec. 24, 2015

(30) Foreign Application Priority Data

Jan. 31, 2013  (JP) .................................. 2013-016664

(51) Int. Cl.
| | | |
|---|---|---|
| *H01M 4/04* | (2006.01) | |
| *H01M 4/1391* | (2010.01) | |
| *H01M 4/36* | (2006.01) | |
| *H01M 4/62* | (2006.01) | |
| *H01M 10/0525* | (2010.01) | |
| *H01M 4/13* | (2010.01) | |
| *H01M 4/139* | (2010.01) | |
| *H01M 10/42* | (2006.01) | |

(52) U.S. Cl.
CPC ......... *H01M 4/622* (2013.01); *H01M 4/0404* (2013.01); *H01M 4/13* (2013.01); *H01M 4/139* (2013.01); *H01M 4/1391* (2013.01); *H01M 4/366* (2013.01); *H01M 4/628* (2013.01); *H01M 10/0525* (2013.01); *H01M 10/4235* (2013.01); *H01M 4/0435* (2013.01); *H01M 2220/30* (2013.01)

(58) Field of Classification Search
CPC .... H01M 4/0404; H01M 4/0435; H01M 4/13; H01M 4/1391; H01M 4/366; H01M 4/622; H01M 10/0525; H01M 2220/30; Y02E 60/122
See application file for complete search history.

(56) References Cited

U.S. PATENT DOCUMENTS

| | | | |
|---|---|---|---|
| 6,335,114 B1 * | 1/2002 | Ueshima | H01M 2/0285 429/161 |
| 7,351,498 B2 | 4/2008 | Watarai et al. | |
| 9,112,239 B2 | 8/2015 | Wu et al. | |
| 2004/0234850 A1 | 11/2004 | Watarai et al. | |
| 2006/0194116 A1 | 8/2006 | Suzuki et al. | |
| 2010/0167129 A1 | 7/2010 | Wu et al. | |
| 2011/0171526 A1 | 7/2011 | Wakizaka et al. | |
| 2012/0164511 A1 * | 6/2012 | Wu | H01M 2/1646 429/144 |
| 2012/0164512 A1 | 6/2012 | Wu et al. | |
| 2013/0171521 A1 | 7/2013 | Sugimoto et al. | |

FOREIGN PATENT DOCUMENTS

| | | |
|---|---|---|
| CN | 1529917 A | 9/2004 |
| CN | 102217121 A | 10/2011 |
| CN | 102318108 A | 1/2012 |
| CN | 102569875 A | 7/2012 |
| JP | 2001-093583 A | 4/2001 |
| JP | 2006-228515 A | 8/2006 |
| JP | 2010-21113 A | 1/2010 |
| JP | 2010-157512 A | 7/2010 |
| JP | 2010-177079 A | 8/2010 |
| JP | 2011-113923 A | 6/2011 |
| JP | 2012-134149 A | 7/2012 |
| JP | 2012-138359 A | 7/2012 |
| TW | 201228070 A1 | 7/2012 |
| WO | WO 2012/036260 A1 | 3/2012 |

OTHER PUBLICATIONS

Grulke, Eric A., "Solubility Parameter Values," Polymer Handbook 4th Edition, VII, pp. 675-711.
International Search Report dated Apr. 8, 2014 issued in Application No. PCT/JP2014/051795.
Office Action issued in Chinese Patent Application No. 201480005970.9 dated Nov. 1, 2016.
Office Action issued in Japanese Patent Application No. 2014-559685 dated Jan. 10, 2017.
Office Action issued in Taiwanese Patent Application No. 103103429 dated Feb. 14, 2017.

\* cited by examiner

*Primary Examiner* — Brittany Raymond
(74) *Attorney, Agent, or Firm* — Foley & Lardner LLP

(57) ABSTRACT

Provided are an electrode for a lithium battery that is capable of providing a lithium battery having both high stability and high battery properties; a process for producing an electrode for a lithium battery, in which a positive electrode plate and/or a negative electrode plate, even when coated with a thermal activation material dissolved in an organic solvent such as a pyrrolidone-based solvent, is prevented from swelling; and a lithium battery including said electrode for a lithium battery. The electrode for a lithium battery includes an electrode plate, a mix layer and a heat insulating layer in this order, wherein the mix layer includes at least an aqueous adhesive and an active material; the heat insulating layer includes at least a thermal activation material; and at least part of the mix layer is in contact with at least part of the heat insulating layer.

5 Claims, No Drawings

ELECTRODE FOR LITHIUM BATTERY AND PRODUCTION PROCESS THEREOF, AND LITHIUM BATTERY

CROSS REFERENCE TO RELATED APPLICATIONS

This application is the National Phase of PCT/JP2014/051795, filed Jan. 28, 2014, which claims priority to Japanese Application No. 2013-016664, filed Jan. 31, 2013.

TECHNICAL FIELD

The present invention is related to an electrode for a lithium battery capable of being used for e.g., a positive electrode plate for a lithium battery, and its production process, as well as a lithium battery including said electrode for a lithium battery.

BACKGROUND ART

Lithium batteries, which are repeatedly useable by charging, have been attracting much attention with recent expectation for environment conservation and carbon reduction. The lithium batteries have many benefits such as having higher energy density, being more lightweight and having longer life span as compared with conventional secondary batteries including nickel hydrogen batteries and lead storage batteries. For these reasons, they are widely used as power sources for electric devices such as mobile phones and notebook computers and electric power tools, and moreover they are focused also as a power source for hybrid automobiles and electric automobiles.

However, automobiles having a lithium battery mounted therein present a significant problem in its safety. A technique for enhancing the safety of the lithium battery that has been reported is the use of maleimide-based polymers (Patent Document 1).

CITATION LIST

Patent Literature

Patent Document 1: JP-A-2012-138359

SUMMARY OF THE INVENTION

Technical Problem

A binder in the above technique is PVDF (polyvinylidene fluoride), which is soluble in a pyrrolidone-based solvent. Therefore, coating electrode plates with the maleimide-based polymer, which is also soluble in a pyrrolidone-based solvent, can thus cause the pyrrolidone-based solvent to infiltrate and swell a positive electrode plate and/or a negative electrode plate, possibly having an adverse effect on, e.g., battery performance.

The present invention has been made to solve such a problem as described above associated with conventional art. It is thus an object of the present invention to provide a process for producing an electrode for a lithium battery, in which a positive electrode plate and/or a negative electrode plate, even when coated with a thermal activation material dissolved in an organic solvent such as a pyrrolidone-based solvent, is prevented from swelling. The present invention further provides an electrode for a lithium battery that is capable of providing a lithium battery having both high safety and high battery properties; and provides a lithium battery including said electrode for a lithium battery.

Technical Solution

The present inventors earnestly studied to solve the above problem, and have found out that the above problem can be solved by using an electrode for a lithium battery (particularly, positive electrode plate for a lithium battery) produced by a process including specific production steps; and by using a lithium battery obtained from components including said electrode (particularly, said positive electrode plate). Also, the present inventors also have found out that the above problem can be solved by using an electrode for a lithium battery containing a specific kind of adhesive as an adhesive (or binder) used at a specific position.

An electrode for a lithium battery of the present invention includes an electrode plate, a mix layer and a heat insulating layer in this order, wherein the mix layer includes at least an aqueous adhesive and an active material; the heat insulating layer includes at least a thermal activation material; and at least part of the mix layer is in contact with at least part of the heat insulating layer.

Preferably, the thermal activation material is a nitrogen-containing polymer that is soluble in an organic solvent and does not swell in water.

Preferably, the nitrogen-containing polymer contains at least one kind of component selected from the group consisting of amines, amides, imides, maleimides and imines and contains a component derived from diones.

Preferably, the aqueous adhesive is an adhesive obtained by dispersing or dissolving in water at least one of an olefin resin and an acrylic resin.

A process for producing an electrode for a lithium battery includes a mix layer formation step of applying a mix slurry that contains an active material and an aqueous adhesive onto a surface of an electrode plate to form a mix layer; and a heat insulating layer formation step of forming a heat insulating layer that contains a thermal activation material on a surface of the mix layer, the steps being carried out in this order.

Preferably, the heat insulating layer formation step is a step of applying a thermal activation material dissolved in an organic solvent onto the surface of the mix layer to form the heat insulating layer.

Further, the present invention also provides a lithium battery including the electrode for a lithium battery.

Effects of the Invention

The inventive electrode for a lithium battery is capable of reducing swelling of electrode plates, thus being able to provide lithium batteries having both high safety and high battery properties. Further, according to the production process of the present invention, even when an electrode, in its preparation, has a thermal activation material dissolved in an organic solvent such as a pyrrolidone-based solvent, particularly even when a positive electrode plate, in its preparation, has a thermal activation material dissolved in an organic solvent such as a pyrrolidone-based solvent, that electrode, particularly that positive electrode plate, does not swell. This leads to obtaining lithium batteries having both high stability and high battery properties. Such lithium batteries are suited for a power source for hybrid automobiles and electric automobiles.

Embodiments of the Invention

The lithium battery of the present invention includes an electrode for a lithium battery which will be described later.

A lithium battery generally has a structure containing a positive electrode, a negative electrode, a separator and an electrolyte solution, and in its typical embodiment has a structure containing a positive electrode plate (a), a negative electrode plate (b), a separator (c), an electrolyte solution (d) and an outer package material (e), wherein the positive electrode plate is opposite to the negative electrode plate via the separator, and an entirety of the battery is filled with the electrolyte solution.

As will be described later, the lithium battery of the present invention uses the inventive electrode for a lithium battery, which will be described later, as the positive electrode and/or the negative electrode, e.g., as the positive electrode plate (a) and/or the negative electrode plate (b). The inventive electrode for a lithium battery can be used particularly preferably as the positive electrode, e.g., as the positive electrode plate (a). An exemplary lithium battery according to a particularly preferred embodiment of the present invention includes the positive electrode plate (a) obtained by a method including the production process of the present invention (that is, a process for producing an electrode for a lithium battery of the present invention which will be described later); the negative electrode plate (b); the separator (c); the electrolyte solution (d); and the outer package material (e). The positive electrode plate is opposite to the negative electrode plate via the separator, and an entirety of the battery is filled with the electrolyte solution.

Hereinafter, the present invention will be described in detail.

[Electrode for Lithium Battery]

The electrode for a lithium battery according to the present invention includes an electrode plate, a mix layer, and a heat insulating layer, in this order.

In the inventive electrode for a lithium battery, the mix layer contains at least an aqueous adhesive and an active material; and the heat insulating layer contains at least a thermal activation material. At least part of the mix layer is in contact with at least part of the heat insulating layer.

The inventive electrode for a lithium battery described above may be a positive electrode or may be a negative electrode. That is, the inventive electrode for a lithium battery, in the lithium battery, may constitute the positive electrode plate (a), or may constitute the negative electrode plate (b). In a preferred embodiment of the present invention, the inventive electrode for a lithium battery is used as the positive electrode, in which case the inventive electrode for a lithium battery constitutes the positive electrode plate (a) in the lithium battery.

Hereinafter, constituent elements that constitute the inventive electrode for a lithium battery will be described.

[Positive Electrode Plate]

The positive electrode plate (a) is obtained by a process including a step of preparing a mix slurry (also referred to as an electrode slurry) containing at least a positive electrode active material and an aqueous adhesive and then applying the slurry onto a surface of an electrode plate to form an electrode mix layer; and a step of forming a thermal activation material on a surface of the electrode mix layer.

[Mix Layer]

The mix layer, which constitutes the inventive electrode for a lithium battery, contains at least the aqueous adhesive and the active material. The mix layer used in the present invention, because of containing the active material, functions as a site where electrode reaction occurs.

The inventive electrode for a lithium battery is employable both as the positive electrode and as the negative electrode. Specifically, when the active material constituting the mix layer is a positive electrode active material described later, the inventive electrode for a lithium battery functions as the positive electrode and is capable of being used as the positive electrode plate (a). On the other hand, when the active material constituting the mix layer is a negative electrode active material described later, the inventive electrode for a lithium battery functions as the negative electrode, and is capable of being used as the negative electrode plate (b).

In a preferred embodiment of the present invention, the inventive electrode for a lithium battery is an electrode for a lithium battery in which the active material constituting the mix layer is the positive electrode active material. In this embodiment, the inventive electrode, due to functioning as the positive electrode, is used the positive electrode plate (a).

The mix layer as used herein is sometimes called an "electrode mix layer".

(Positive Electrode Active Material)

In the present invention, the positive electrode active material capable of constituting the mix layer may be the one known as being used for electrochemical cells. Examples of positive electrode active materials employable in the present invention include composite oxides composed of lithium and a transition metal, such as $LiMnO_2$, $LiMn_2O_4$, $LiCoO_2$, $Li_2Cr_2O_7$, $Li_2CrO_4$, $LiNiO_2$, $LiFeO_2$, $LiNi_xCo_{1-x}O_2$ ($0<x<1$), $LiMPO_4$ (e.g., a transition metal defined by M being Fe), $LiMn_{0.5}Ni_{0.5}O_2$, $LiNi_xCo_yMn_zO_2$ ($x+y+z=1$) $LiNi_xCo_yAl_zO_2$ ($x+y+z=1$), $LiM_{0.5}Mn_{1.5}O_4$ (M=a divalent metal); as well as organic polymer materials such as polyaniline, polythiophene, polypyrrole, polyacetylene, polyacene and dimercaptothiadiazole/polyaniline composites.

(Negative Electrode Active Material)

As the negative electrode active material, known materials capable of doping and dedoping lithium ions may be used with no particular limitation. Examples thereof include carbides, lithium alloys and metal oxides. Examples of the carbides include carbon powder, graphite, carbon fibers and carbon nanotube. Examples of the lithium alloys are alloys formed by lithium together with any of a silicon atom, a tin atom and a germanium atom, or with any of oxides, carbides, nitrides, carbonitrides and the like which contain any one of these atoms. Examples of negative electrode material containing a silicon atom include silicon alloys and compounds formed by silicon together with any of boron, nitrogen, oxygen and carbon, as well as silicon compounds containing any of tin, nickel, copper, iron, cobalt, manganese, zinc, indium, silver, titanium, germanium, bismuth, antimony and chromium. Examples of the silicon alloys or compounds include $SiB_4$, $SiB_5$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_x$ ($0<x\leq2$) and LiSiO. Examples of negative electrode active materials containing a tin atom include tin alloys and compounds containing any of silicon, nickel, copper, iron, cobalt, manganese, zinc, indium, silver, titanium, germanium, bismuth, antimony and chromium; as well as compounds formed by tin together with any of oxygen, carbon and nitrogen. Examples of negative electrode active materials containing a germanium atom include germanium alloys and compounds containing any of silicon, nickel, copper, iron, cobalt, manganese, zinc, indium, silver, titanium, germanium, bismuth, antimony and chromium; as well as compounds formed by germanium together with any of oxygen, carbon and nitrogen. Other examples include LiAl, $Li_3Cd$, $Li_{4.4}Pb$, $In_2O$, $In_2O_3$, PbO, $PbO_2$, $Pb_2O_3$, $Pb_3O_4$, $Ag_2O$, AgO, $Ag_2O_3$, ZnO, CoO, NiO, FeO, $TiO_2$, and $Li_3Ti_5O_{12}$.

These negative electrode active materials may be used singly, or in combination of two or more kinds.

In the specification, the term "active material" is sometimes used as a concept collectively referring to the positive electrode active material and the negative electrode active material.

(Aqueous Adhesive)

The aqueous adhesive is, for example, an adhesive using water as a solvent or an emulsion adhesive using water as a dispersion medium. In the present invention, the aqueous adhesive is used as a binder for disposing the active material on a surface of the electrode plate (collector). Adopting the mix layer containing the aqueous adhesive in the inventive electrode for a lithium battery provides an advantageous effect that, even when an organic solvent, e.g., a pyrrolidone-based solvent, is used to form the heat insulating layer which will be described later, the resultant electrode, when used as the positive electrode plate and/or as the negative electrode plate, does not swell. Such an advantageous effect is accomplished particularly when the inventive electrode for a lithium battery having the mix layer containing the aqueous adhesive is adopted in the positive electrode, e.g., the positive electrode plate (a).

In the present invention, the aqueous adhesive is given by dissolving an adhesive component in water, or by dispersing particles of an adhesive component in water. The dispersing as used herein refers to an act providing a state in which particles when visually observed are dispersed without being agglomerated in the adhesive, wherein part of the particles may be dissolved. Examples of the adhesive component are polymers of olefin resins and acrylic resins.

A polymer contained in the aqueous adhesive is not particularly limited as long as it functions as an adhesive component, is capable of being dissolved or dispersed in water, and does not impair performance of the mix layer. Examples of such a polymer include polymers composed of one kind of monomer or two or more kinds of monomers selected from olefin-based monomers, acrylic monomers, diene-based monomers, halogen-based monomers, vinyl-based monomers, silicone-based monomers, halogenated olefin-based monomers, urethane-based monomers, amide-based monomers and imide-based monomers. Preferred are olefin monomers, acrylic monomers and diene-based monomers.

Examples of the olefin monomers capable of constituting the polymer described above include ethylene, propylene and 1-butene. Examples of the acrylic monomers include acrylic acid, methacrylic acid, crotonic acid, itaconic acid, fumaric acid, maleic acid, hydroxyethyl acrylate, hydroxypropyl acrylate, methyl acrylate, ethyl acrylate, n-butyl acrylate, iso-butyl acrylate, 2-ethylhexyl acrylate, lauryl acrylate, methyl methacrylate, ethyl methacrylate, n-butyl methacrylate, iso-butyl methacrylate, 2-ethylhexyl methacrylate, lauryl methacrylate, acrylonitrile, methacrylonitrile, acrylamide, methacrylamide, and acrylic sulfonic acid. Examples of the diene-based monomers include butadiene. Examples of the silicone-based monomers include diorganosiloxanes or organosiloxanes having e.g., a vinyl group, an allyl group, a propenyl group, an isopropenyl group or a butenyl group. Examples of the halogen-based monomers include ethylene tetrafluoride and chlorotrifluoroethylene. Examples of the vinyl-based monomers include vinyl alcohol, vinyl acetate, divinylbenzene, styrene and vinyl stearate.

Examples of preferred embodiments of the aqueous adhesive described above are olefin resins having constituent units corresponding to the olefin monomers as well as acrylic resins having constituent units corresponding to the acrylic monomers, at least one of these resins being dispersed or dissolved in water. For example, the aqueous adhesive is preferably a polyolefin adhesive having as a constituent unit at least one kind of olefin monomer.

The synthesis of the aqueous adhesive, given by dispersing or dissolving in water, is not particularly limited in its production process, as long as the polymer is dispersed or dissolved in water. An exemplary adoptable method for synthesis of and dispersing or dissolving such an aqueous adhesive in water may be a known polymerization method, such as emulsification polymerization method, suspension polymerization method, dispersion polymerization method, or solution polymerization method. Other adoptable methods include a method in which a polymer is previously prepared and the polymer is turned into a molten resin, and then the resin is forcibly torn apart in water by stirring; and a method of adding water to a resin that has been molten and kneaded with an extruder.

In the aqueous adhesive of the present invention, another solvent may be mixed with water as long as the effects of the present invention are achieved. Examples of the solvent to be mixed with water include aliphatic alcohols such as ethanol and isopropyl alcohol; ketone-based solvents such as acetone, methyl isobutyl ketone and methyl ethyl ketone; ester-based solvents such as ethyl acetate, butyl acetate, γ-butyrolactone, ε-caprolactone; and amide-based solvents such as N,N-dimethylacetamide and N,N-dimethylformamide. These may be used singly or in combination of two or more kinds at the time of mixing.

In use of the inventive electrode for a lithium battery as a positive electrode, an amount ratio between the positive electrode active material and the aqueous adhesive at the time of preparing the mix slurry is not particularly limited, but is preferably 1 to 20 parts by mass (in terms of solid content) of the aqueous adhesive based on 100 parts by mass of the positive electrode active material.

On the other hand, in use of the inventive electrode for a lithium battery as a negative electrode, an amount ratio between the negative electrode active material and the aqueous adhesive at the time of preparing the mix slurry is not particularly limited, but is preferably 0.5 to 20 parts by mass (in terms of solid content) of the aqueous adhesive based on 100 parts by mass of the negative electrode active material.

(Other Component)

The mix layer used in the present invention, in addition to containing the active material and the aqueous adhesive, may contain appropriate components for producing the mix layer. For example, when the mix layer used in the present invention is formed from the mix slurry, the mix layer contains in some cases various blending components derived from the mix slurry. Examples of such various blending components derived from the mix slurry include known conductive assistants such as thickening agents, and (conductive) carbon black and graphite, as well as other additives such as surfactants, dispersing agents, wetting agents and defoaming agents. Specific examples of these various blending components will be provided in the section "Process for Forming Mix Layer" described below.

(Process for Forming Mix Layer)

The mix layer, which constitutes the electrode for a lithium battery according to the present invention, is producible by preparing an aqueous mix slurry (also referred to as a "mix slurry" herein) and then applying the slurry onto a surface of a collector (electrode plate) and its drying. In this case, the mix slurry contains, as essential components, the active material and the aqueous adhesive. In the inventive process for producing an electrode for a lithium battery which will be described later, the step of applying the mix slurry onto the surface of the electrode plate to form the mix layer is sometimes called a mix layer formation step.

The mix slurry, in addition to containing the essential components which are the active material and the aqueous adhesive, may contain a thickening agent. As the thickening agent, known thickening agents may be used which are used for electrochemical cells. Examples thereof include cellulose-based polymers such as carboxymethyl cellulose, methylcellulose and hydroxypropyl cellulose as well as their ammonium salts and alkali metal salts; (modified) poly(meth)acrylic acids and their ammonium salts and alkali metal salts; (modified) polyvinyl alcohols, copolymers of a vinyl alcohol and acrylic acid or an acrylic acid salt, and polyvinyl alcohols including copolymers of a vinyl alcohol and maleic anhydride or maleic acid or fumaric acid; and polyethylene glycol, polyethylene oxide, polyvinyl pyrrolidone, modified polyacrylic acid, oxide starches, phosphoric acid starch, casein, and various modified starches.

The mix slurry may contain known conductive assistants such as (conductive) carbon black and graphite.

As needed, an additive may be added to the mix slurry. The additive is not particularly limited as long as the effects of the present invention are achieved. Examples thereof include surfactants, dispersing agents, wetting agents and defoaming agents.

The mix slurry, in its preparation, is obtained by adding water, the positive electrode active material, the conductive assistant, the aqueous adhesive, the thickening agent, an additive to be added as needed, and a solvent other than water to be added as needed, to a stirring device and stirring them. As the solvent other than water, for example, solvents listed for the aqueous adhesive may be used. The preparation of the mix slurry is not limited in terms of type of stirring devices. Examples thereof include a ball mill, a sand mill, a pigment dispersing machine, a grinding machine, an ultrasonic dispersing machine, a homogenizer, a planetary mixer, a Hobart mixer, and a high-speed stirring machine.

In applying the mix slurry onto a collector and drying the mix slurry, its application and drying methods are not particularly limited. Exemplary methods include slot-die coating, slide coating, curtain coating and gravure coating. Exemplary drying methods include drying using warm air, hot air or low-humidity air, vacuum drying, and drying using (far) infrared ray. Drying time and drying temperature are not particularly limited, but drying time is usually 1 to 30 minutes, and drying temperature is usually 40 to 180° C.

It is preferred in the production process of the present invention that the step of applying the mix slurry onto a collector and drying the mix slurry be followed by a step of pressure application treatment using a pressing mold, a pressing roll or the like which is aimed at reducing porosity of the active material layer.

[Heat Insulating Layer]

In the present invention, the heat insulating layer contains at least the thermal activation material. In the inventive electrode for a lithium battery, at least part of the mix layer is in contact with at least part of the heat insulating layer. In other words, in the inventive electrode for a lithium battery, the heat insulating layer exists in such a manner that at least part thereof is in contact with at least part of the mix layer. In a typical embodiment of the present invention, the heat insulating layer containing the thermal activation material is formed on a surface of the electrode mix layer (i.e., the mix layer).

In the present invention, the thermal activation material, which constitutes the heat insulating layer, is a material which, with increase of temperature of the lithium battery, comes to be activated to cause crosslinking reaction. By the thermal activation material being converted to a polymer, lithium ions are prevented from diffusing, which lowers conductivity of the electrolyte solution. The thermal activation material, which through its crosslinking reaction inhibits oxygen molecules from being released from the positive electrode, inhibits exothermic reaction from taking place between the positive electrode and the electrolyte solution, thereby playing a part also in improving the safety of the lithium battery.

(Thermal Activation Material)

As long as exhibiting such performance as described above and maintaining the performance of the present invention, the thermal activation material is not particularly limited in its ingredient, but is preferably a nitrogen-containing polymer which is soluble in an organic solvent and does not swell in water.

The phrase "soluble in an organic solvent" described for the thermal activation material refers to a situation where a residue given when 1 g of the thermal activation material put in an organic solvent is stirred at room temperature for 1 hour and filtered through a 100-mesh filter weighs not more than 0.5 g. The "organic solvent" is preferably an organic solvent having a solubility parameter (SP value) of 22 to 26 $(MPa)^{1/2}$. ASP value of a solvent can be determined, for example, by a method described in "Polymer Handbook", Fourth edition, VII-page 675 to VII-page 711, the method being specifically described in Table 1 (VII-page 683) and Tables 7 to 8 (VII-page 688 to VII-page 711). ASP value of a mixed solvent composed of multiple solvents can be determined by known method. For example, a SP value of a mixed solvent can be determined, assuming that additivity is established, as a sum of all of products, each product of a SP value of each solvent and a volume proportion of each solvent.

The phrase "not swell in water" described for the thermal activation material means that a swell percentage as determined by a method described below is not more than 100%.

$$\text{Swell percentage (\%)}=[(Y-X)/X]\times 100$$

(wherein, when X g of the thermal activation material is added to water at room temperature, and this is followed by stirring and filtration, a weight of the resultant residue is defined as Y g.)

As the thermal activation material described above, for example, thermal activation materials described, for example, in JP-A-2012-134149 and JP-A-2012-138359, may be used. Specifically, preferred nitrogen-containing polymers employable in the present invention include nitrogen-containing compounds having a number average molecular weight of at least 1500, or nitrogen-containing oligomers having a number average molecular weight of about 200 to 2999. In an embodiment, the thermal activation material may be the one containing a nitrogen-containing polymer wherein the nitrogen-containing polymer is a hyper branched polymer formed by reaction of at least one component selected from the group consisting of amines, amides, imides, maleimides and imines with a dione. That is, the nitrogen-containing polymer according to a preferred embodiment of the present invention contains at least one component selected from the group consisting of amines, amides, imides, maleimides and imines and contains a component derived from diones. Specific examples of amines, amides, imides, maleimides and imines, any of which constitutes the nitrogen-containing polymer, are those described in JP-A-2012-134149. In more detail, diones include barbituric acid, derivatives of barbituric acid, acetylacetone, and derivatives of acetylacetone. Among them, preferred are nitrogen-containing polymers obtained from components including both a bismaleimide monomer such as N,N'-bismaleimide-4,4'-diphenylmethane (BMI) and barbituric acid (BTA).

A molar ratio of a necessary amount of a dione to a necessary amount of a monomer of amine, amide, imide, maleimide or imine ranges between about 1:20 and 4:1. The molar ratio more preferably ranges between about 1:5 and 2:1. The molar ratio still more preferably ranges between about 1:3 and 1:1.

The thermal activation material, before its thermal activation, is usually dispersed uniformly within the heat insulating layer. Notably, the thermal activation material, before its thermal activation, is a macromolecular material, and therefore does not affect diffusion of lithium ions in the lithium battery. Increase in temperature of the lithium battery, meanwhile, causes crosslinking reaction to take place in the thermal activation material, which causes the thermal activation material to be converted to a polymer. This delays the diffusion of lithium ions, which in turn decreases conductivity of the electrolyte solution, thereby being able to enhancing safety. In other words, at the time temperature of the lithium battery is elevated, crosslinking reaction takes place at terminal groups of the thermal activation material, which inhibits the diffusion of lithium ions. This makes it possible to suppress the release of oxygen molecules from heated plates, and to prevent exothermic reaction from taking place between the plates and the electrolyte solution in the lithium battery, leading to enhanced safety of the lithium battery. Temperature of the crosslinking reaction of the thermal activation material is an onset temperature. For example, when a nitrogen-containing polymer is formed as a result of reaction between bismaleimide and barbituric acid, the terminal groups of the thermal activation material having an ethenyl group (derived from bismaleimide) and an amino group (derived from barbituric acid), the thermal activation temperature is a temperature of the crosslinking reaction between an ethenyl group and an amino group that takes place when a temperature of the battery is elevated. In the present invention, the thermal activation temperature is about 80 to 280° C. The thermal activation temperature is more preferably about 100 to 220° C. The thermal activation temperature is still more preferably about 130 to 200° C.

(Other Component)

The heat insulating layer, not only containing the thermal activation material, but also may contain according to purpose inorganic materials such as Al, Mg, Si, Zr, Ti, Zn, Li and Co, or its oxides, its hydroxides, its sulfides, its nitrides or its halides; lithium-containing salts such as $Li_2CO_3$; and oxides, hydroxides, sulfides, nitrides, carbonates, halides each of which contains lithium. Further, the heat insulating layer may contain an adhesive: for example, polyvinylidene fluoride dissolved or dispersed in a Brønsted base solvent such as N-methylpyrrolidone (NMP), dimethylformamide (DMF), dimethylacetamide (DMAC), pyrrolidone, and N-dodecylpyrrolidone; or a Brønsted neutral solvent such as γ-butyrolactone (GBL); or a solvent given by combining any of these solvents.

(Process for Forming Heat Insulating Layer)

In the present invention, a process for forming the heat insulating layer on a surface of the electrode mix layer (i.e., the mix layer) is not particularly limited, but is preferably done by way of coating. In a typical embodiment of the present invention, the heat insulating layer can be formed by applying the thermal activation material dissolved in an organic solvent onto the mix layer surface. In this case, by the organic solvent contained in the slurry applied evaporating, the application of the thermal activation material and other components to be optionally used is completed, so that the heat insulating layer containing at least the thermal activation material is formed on the mix layer surface.

As coating method, slot-die coating, slide coating, curtain coating, or gravure coating is preferable. Another employable method other than the coating is by way of spray coating. A coating liquid is usually a liquid containing the thermal activation material and an appropriate organic solvent. Examples of a preferred organic solvent that constitutes such a coating liquid include Brønsted base solvents such as N-methylpyrrolidone (NMP), dimethylformamide (DMF), dimethylacetamide (DMAC), pyrrolidone, N-dodecylpyrrolidone, or solvents given by combining any of these. In order to control an acidity-base value, to the Brønsted base described above, another solvent, for example, a Brønsted neutral solvent, e.g., γ-butyrolactone (GBL), may be added.

In the inventive process for producing an electrode for a lithium battery, which will be described below, the step of forming the heat insulating layer containing the thermal activation material on the surface of the mix layer is sometimes called a heat insulating layer formation step.

A thickness of the heat insulating layer, which is not particularly limited, is preferably about 0.1 to 50 μm.

[Process for Producing Electrode for Lithium Battery]

The present invention provides, as a second invention, a process for producing an electrode for a lithium battery.

The process for producing an electrode for a lithium battery according to the present invention includes
a mix layer formation step of applying the mix slurry that contains the active material and the aqueous adhesive onto a surface of an electrode plate to form the mix layer; and
a heat insulating layer formation step of forming the heat insulating layer that contains the thermal activation material on the surface of the mix layer, the steps being carried out in this order.

The production process of the present invention described above gives the electrode for a lithium battery having the electrode plate, the mix layer, and the heat insulating layer in this order. According to the production process of the present invention, the mix layer formed contains at least the aqueous adhesive and the active material, and the heat insulating layer formed contains at least the thermal activation material.

Specific positive electrode active materials and negative electrode active materials that are used as active materials in the mix layer formation step may be examples listed in the sections "Positive Electrode Active Material" and "Negative Electrode Active Material", respectively, set forth in the "Mix Layer" section. The aqueous adhesives, and other various blending components capable of constituting the mix slurry, may be examples listed in the sections "Aqueous Adhesive" and "Other Component", respectively, set forth in the "Mix Layer" section.

On the other hand, in the heat insulating layer formation step, the thermal activation material and other components capable of constituting the heat insulating layer may be the above-described examples listed as the "Thermal Activation Material" and "Other component", respectively, set forth in the section "Heat Insulating Layer".

Specific procedures conducted in the mix layer formation step are as described in the section "Process for Forming Mix Layer" set forth in the section "Mix Layer". Specific procedures conducted in the heat insulating layer formation step are as described in the section "Process for Forming Heat Insulating Layer" set forth in the section "Heat Insulating Layer".

[Lithium Battery]

The present invention provides, as a third invention, a lithium battery.

The lithium battery according to the present invention includes the above-described electrode for a lithium battery.

As described above, a lithium battery generally has a structure of containing a positive electrode, a negative electrode, a separator and an electrolyte solution, the lithium battery in a typical embodiment having a structure of containing a positive electrode plate (a), a negative electrode plate (b), a separator (c), an electrolyte solution (d) and an outer package material (e), wherein the positive electrode plate is opposite to the negative electrode plate via the separator, and an entirety of the battery is filled with the electrolyte solution. The lithium battery of the present invention includes the above-described electrode for a lithium battery in the form of the positive electrode and/or the negative electrode, for example, in the form of the positive electrode plate (a) and/or the negative electrode plate (b).

In a particularly preferred embodiment of the present invention, the positive electrode, e.g., the positive electrode plate (a), is the inventive electrode for a lithium battery whose active material is a positive electrode active material, or an electrode for a lithium battery which is obtained by the production process of the present invention and whose active material is a positive electrode active material.

[Positive Electrode (Positive Electrode Plate)]

In the lithium battery according to the present invention, the above-described electrode for a lithium battery according to the present invention is preferably used as a positive electrode, e.g., as the positive electrode plate (a). In this case, the lithium battery according to the present invention has the above-described electrode for a lithium battery whose active material is a positive electrode active material and which functions as the positive electrode, e.g., as the positive electrode plate (a).

The above-described electrode for a lithium battery which functions as the positive electrode described above, e.g., as the positive electrode plate (a) is obtained suitably by the above-described process for producing an electrode for a lithium battery with the use of the positive electrode active material as an active material. Specifically, in a preferred embodiment of the present invention, the positive electrode, e.g., the positive electrode plate (a), is obtained by a process which includes a step of preparing the mix slurry that contains at least the positive electrode active material and the aqueous adhesive (also referred to as the electrode slurry) and then applying the slurry onto an electrode plate surface to form the electrode mix layer, and a step of forming the heat insulating layer containing the thermal activation material on a surface of the electrode mix layer.

[Negative Electrode (Negative Electrode Plate)]

In the lithium battery according to the present invention, the negative electrode, e.g., the negative electrode plate (b), may be a negative electrode (or negative electrode plate) having publicly known configurations, or may be the above-described electrode for a lithium battery according to the present invention.

When the negative electrode, e.g., the negative electrode plate (b), is the above-described electrode for a lithium battery according to the present invention, the negative electrode, e.g., the negative electrode plate (b), can be produced in accordance with the above-described "Process for Producing Electrode for Lithium Battery", using the negative electrode active material as an active material.

On the other hand, in the lithium battery according to the present invention, the negative electrode, e.g., the negative electrode plate (b), may be a negative electrode having publicly known configurations. In this case, the negative electrode, e.g., the negative electrode plate (b), is producible, for example, by preparing a mix slurry containing a negative electrode active material and then applying the slurry onto a surface of a collector (electrode plate) and drying the slurry. For the mix slurry preparation method and the slurry application/drying method, reference can be made in the process for producing the electrode mix layer (mix layer). In the preparation of the mix slurry, not only the aqueous solvent containing the aqueous adhesive described in the process for producing the electrode mix layer, but also a non-aqueous solvent such as polyvinylidene fluoride, may be used. Also, the mix slurry may contain a conductive assistant such as (conductive) carbon black.

[Separator]

In the present invention, the separator (c) is disposed between the positive electrode plate and the negative electrode plate. Its materials include (micro)porous polyethylene, (micro) porous polypropylene, Teflon (registered trademark) film, polyamide film, polyvinyl chloride film, polyvinylidene fluoride film, polyaniline film, polyimide film, nonwoven fabric, polyethylene terephthalate, polystyrene cellulose, and multilayer composite structures given by combining two or more of these polymers. Also, the separator (c) may be coated with other resins excellent in thermal stability. Further, between the negative electrode plate and the separator, a porous heat resistant layer containing a heat resistant filler and an adhesive may be present. Examples of the heat resistant filler that may be used include inorganic oxides such as alumina, silica, titania, zirconia, magnesia and yttria, ceramics and glass. These may be used singly or in combination of two or more kinds. As the adhesive, not only the aqueous solvent containing the aqueous adhesive which is described in the process for producing the electrode mix layer, but also a non-aqueous solvent containing a non-aqueous binder such as polyvinylidene fluoride, may be used. Preferably, the adhesive is used at 0.5 to 20 parts by mass (in terms of solid content) based on 100 parts by mass of the heat-resistant filler.

[Electrolyte Solution]

The positive electrode plate, the negative electrode plate and the separator are, in their entirety, immersed in the electrolyte solution (d). Examples of the electrolyte solution include propylene carbonate, ethylene carbonate, γ-butyrolactone, dimethylsulfoxide, dimethylcarbonate, ethylmethylcarbonate, diethylcarbonate, 1,2-dimethoxyethane, 1,2-diethoxyethane and tetrahydrofuran. These are used singly or as a mixture of two or more kinds. In the electrolyte solution, a lithium salt is dissolved. The lithium salt that may be used is one kind of electrolyte or a combination of two or more kinds of electrolytes, such as $LiPF_6$, $LiBF_4$, $LiClO_4$, $LiAsF_6$, $CF_3SO_3Li$, and $(CF_3SO_2)_2N.Li$, the electrolytes being dissolved in an organic solvent in their use. To the electrolyte solution, additives may be added as needed, such as vinylene carbonate, 1,3-propenesultone, lithium bis(oxalate)borate (LiBOB), and maleimide-based compounds.

[Outer Package Material]

The outer package material of the lithium battery is preferably a metal can, its examples being a can composed of any of iron, stainless steel, aluminum and the like. The outer package material may be a film-like bag given by laminating a resin on an ultrathin aluminum. The outer package material may have any shape which is for example cylindrical shape, square-shape, thin type or coin-shaped.

EXAMPLES

Hereinafter, the present invention will be specifically described with reference to Examples and Comparative Examples, but is not limited by these Examples.

Example 1

<Preparation of Aqueous Positive Electrode Plate for Lithium Battery, $LiNi_{0.4}Mn_{0.4}Co_{0.2}O_2$>
(Preparation of Mix Slurry)

100 parts by weight of $LiNi_{0.4}Mn_{0.4}Co_{0.2}O_2$; 4.44 parts by weight of conductive carbon black (Super P manufactured by TIMCAL); 2.22 parts by weight of graphite (KS-6 manufactured by TIMCAL); 1.11 parts by weight in terms of solid content of carboxymethyl cellulose (WS-A manufactured by DAI-ICHI KOGYO SEIYAKU CO., LTD.) which had been previously dissolved in water; and 4.44 parts by weight in terms of solid content of an olefin-based aqueous adhesive dispersed in water (CHEMIPEARL EVS6500N, Mitsui Chemicals, Inc.) were added. By using a planetary mixer and a high-speed stirring machine (manufactured by INOUE MFG., INC.), a mix slurry was prepared. Further, water was added to control viscosity for dispersion control.
(Application onto Positive Electrode Plate)

The mix slurry obtained above was used for its application onto a collector for positive electrode plate, and dried. The application and drying were conducted with a coating device (manufactured by INOUE MFG., INC.), which had three drying zones. In a first drying zone, a second drying zone and a third drying zone, the aqueous slurry was dried at 60° C., 90° C. and 120° C., respectively. The wind velocity was set at 12 m/s. On one surface of an aluminum foil having a thickness of 20 μm serving as the collector for positive electrode plate, the mix slurry was applied and dried. On the other surface thereof, too, the mix slurry was similarly applied and dried. As a result, a precursor electrode for positive electrode plate was given. The application amount per one surface was 12 mg/cm² at the time when the drying was completed.
(Pressing Step)

The electrode prepared (i.e., the precursor electrode for positive electrode plate) was rolled with a roll pressing machine, to give a rolled precursor electrode for positive electrode plate. The treatment was carried out such that the electrode mix layer had a density of 3 g/cm³.
(Preparation of Coating Liquid for Heat Insulating Layer)

To a 1 L flask charged with N-methylpyrrolidone, N,N'-bismaleimide-4,4'-diphenylmethane (manufactured by Hakuei) and barbituric acid (manufactured by Hakuei) were added at a ratio of 2:1, and heated with stirring at 130° C. for 48 hours. The resultant solution was diluted so as to provide a 2% solution.
(Preparation of Heat Insulating Layer)

By using the above coating device, the coating liquid for heat insulating layer was applied onto the electrode which had undergone the steps ending with the pressing step (i.e., the rolled precursor electrode for the positive electrode plate), and then dried. The drying was carried out at 100° C., 130° C. and 150° C. The wind velocity was set at 12 m/s.

The liquid was applied such that a thickness of the layer at the time of its application was 12.5 μm. Consequently, a positive electrode plate was obtained.

Comparative Example 1

<Preparation of Solvent-Based Positive Electrode Plate for Lithium Battery, $LiNi_{0.4}Mn_{0.4}Co_{0.2}O_2$>

100 parts by weight of $LiNi_{0.4}Mn_{0.4}Co_{0.2}O_2$; 4.44 parts by weight of conductive carbon black (Super P manufactured by TIMCAL); 2.22 parts by weight of graphite (KS-6 manufactured by TIMCAL); and 4.44 parts by weight in terms of solid content of PVDF (polyvinylidene fluoride, KF polymer W1300 manufactured by KUREHA CORPORATION) dissolved in N-methylpyrrolidone, were added. By using a planetary mixer and a high-speed stirring machine (INOUE MFG., INC.), a mix slurry was prepared. Further, for viscosity control, N-methylpyrrolidone was added to control the dispersion.

The mix slurry obtained was used for its application onto a collector for positive electrode plate in the same manner as in Example 1. In the three drying zones, the slurry was dried at 100 C.°, 110° C. and 120° C., which were respectively higher than the temperatures in the case of the aqueous slurry. The application amount per one surface was 12 mg/cm² at the time when the drying was completed.

The resultant precursor electrode for positive electrode plate was subjected to the pressing step and then coated with the heat insulating layer, in the same manner as in Example 1. As a result, a positive electrode plate was obtained.

Reference Examples 1-1 and 1-2

Example 1 and Comparative Example 1 were repeated except that the heat insulating layer was not prepared. As a result, each positive electrode plate was prepared.

The positive electrode plate which had not been coated with the heat insulating layer in Example 1 was defined as Reference Example 1-1. The positive electrode plate which had not been coated with the heat insulating layer in Comparative Example 1 was defined as Reference Example 1-2.

Example 2

<Preparation of Aqueous Positive Electrode Plate for Lithium Battery, $LiMn_2O_4$>

A mix slurry was prepared in the same manner as in Example 1, except that the active material was changed from $LiNi_{0.4}Mn_{0.4}Co_{0.2}O_2$ to $LiMn_2O_4$, and was applied in the same manner as in Example 1. The application amount per one surface was 20 mg/cm² at the time when the drying was completed. The pressing step was carried out such that the electrode mix layer had a density of 2.5 g/cm³. The heat insulating layer was applied in the same manner as in Example 1.

Comparative Example 2

<Preparation of Solvent-Based Positive Electrode Plate for Lithium Battery, $LiMn_2O_4$>

A mix slurry was prepared in the same manner as in Comparative Example 1, except that the active material was changed from $LiNi_{0.4}Mn_{0.4}Co_{0.2}O_2$ to $LiMn_2O_4$, and was applied in the same manner as in Comparative Example 1. The application amount per one surface was 20 mg/cm² at the time when the drying was completed. The pressing step was carried out such that the electrode mix layer had a density of 2.5 g/cm$^3$. The heat insulating layer was applied in the same manner as in Example 1.

Reference Examples 2-1 and 2-2

Example 2 and Comparative Example 2 were repeated except that the heat insulating layer was not prepared. As a result, each positive electrode plate was prepared.

The positive electrode plate which had not been coated with the heat insulating layer in Example 2 was defined as Reference Example 2-1. The positive electrode plate which had not been coated with the heat insulating layer in Comparative Example 2 was defined as Reference Example 2-2.

Example 3

<Preparation of Aqueous Positive Electrode Plate for Lithium Battery, LiCoO$_2$>

A mix slurry was prepared in the same manner as in Example 1, except that the active material was changed from LiNi$_{0.4}$Mn$_{0.4}$Co$_{0.2}$O$_2$ to LiCoO$_2$, and was applied in the same manner as in Example 1. The application amount per one surface was 15 mg/cm$^2$ at the time when the drying was completed. The pressing step was carried out such that the electrode mix layer had a density of 3 g/cm$^3$. The heat insulating layer was applied in the same manner as in Example 1.

Comparative Example 3

<Preparation of Solvent-Based Positive Electrode Plate for Lithium Battery, LiCoO$_2$>

A mix slurry was prepared in the same manner as in Comparative Example 1, except that the active material was changed from LiNi$_{0.4}$Mn$_{0.4}$Co$_{0.2}$O$_2$ to LiCoO$_2$, and was applied in the same manner as in Comparative Example 1. The application amount per one surface was 15 mg/cm$^2$ at the time when the drying was completed. The pressing step was carried out such that the electrode mix layer had a density of 3 g/cm$^3$. The heat insulating layer was applied in the same manner as in Example 1.

Reference Examples 3-1 and 3-2

Example 3 and Comparative Example 3 were repeated except that the heat insulating layer was not prepared. As a result, each positive electrode plate was prepared.

The positive electrode plate which had not been coated with the heat insulating layer in Example 3 was defined as Reference Example 3-1. The positive electrode plate which had not been coated with the heat insulating layer in Comparative Example 3 was defined as Reference Example 3-2.

Example 4

<Preparation of Aqueous Positive Electrode Plate for Lithium Battery, LiMn$_{1.5}$Ni$_{0.5}$O$_4$>

A mix slurry was prepared in the same manner as in Example 1, except that the active material was changed from LiNi$_{0.4}$Mn$_{0.4}$Co$_{0.2}$O$_2$ to LiMn$_{1.5}$Ni$_{0.5}$O$_4$, and was applied in the same manner as in Example 1. The application amount per one surface was 15 mg/cm$^2$ at the time when the drying was completed. The pressing step was carried out such that the electrode mix layer had a density of 2.5 g/cm$^3$. The heat insulating layer was applied in the same manner as in Example 1.

Comparative Example 4

<Preparation of Solvent-Based Positive Electrode Plate for Lithium Battery, LiMn$_{1.5}$Ni$_{0.5}$O$_4$>

A mix slurry was prepared in the same manner as in Comparative Example 1, except that the active material was changed from LiNi$_{0.4}$Mn$_{0.4}$Co$_{0.2}$O$_2$ to LiMn$_{1.5}$Ni$_{0.5}$O$_4$, and was applied in the same manner as in Comparative Example 1. The application amount per one surface was 15 mg/cm$^2$ at the time when the drying was completed. The pressing step was carried out such that the electrode mix layer had a density of 2.5 g/cm$^3$. The heat insulating layer was applied in the same manner as in Example 1.

Reference Examples 4-1 and 4-2

Example 4 and Comparative Example 4 were repeated except that the heat insulating layer was not prepared. As a result, each positive electrode plate was prepared.

The positive electrode plate which had not been coated with the heat insulating layer in Example 4 was defined as Reference Example 4-1. The positive electrode plate which had not been coated with the heat insulating layer in Comparative Example 4 was defined as Reference Example 4-2.

Example 5

<Preparation of Aqueous Positive Electrode Plate for Lithium Battery, LiFePO$_4$>

A mix slurry was prepared in the same manner as in Example 1, except that the active material was changed from LiNi$_{0.4}$Mn$_{0.4}$Co$_{0.2}$O$_2$ to LiFePO$_4$, and was applied in the same manner as in Example 1. The application amount per one surface was 16 mg/cm$^2$ at the time when the drying was completed. The pressing step was carried out such that the electrode mix layer had a density of 2 g/cm$^3$. The heat insulating layer was applied in the same manner as in Example 1.

Comparative Example 5

<Preparation of Solvent-Based Positive Electrode Plate for Lithium Battery, LiFePO$_4$>

A mix slurry was prepared in the same manner as in Comparative Example 1, except that the active material was changed from LiNi$_{0.4}$Mn$_{0.4}$Co$_{0.2}$O$_2$ to LiFePO$_4$, and was applied in the same manner as in Comparative Example 1. The application amount per one surface was 16 mg/cm$^2$ at the time when the drying was completed. The pressing step was carried out such that the electrode mix layer had a density of 2 g/cm$^3$. The heat insulating layer was applied in the same manner as in Example 1.

Reference Examples 5-1 and 5-2

Example 5 and Comparative Example 5 were repeated except that the heat insulating layer was not prepared. As a result, each positive electrode plate was prepared.

The positive electrode plate which had not been coated with the heat insulating layer in Example 5 was defined as Reference Example 5-1. The positive electrode plate which had not been coated with the heat insulating layer in Comparative Example 5 was defined as Reference Example 5-2.

Example 6

<Preparation of Aqueous Positive Electrode Plate for Lithium Battery, LiNi$_{0.4}$Mn$_{0.4}$Co$_{0.2}$O$_2$, Polypropylene-based Adhesive>

A mix slurry was prepared in the same manner as in Example 1, except that the adhesive was changed from the olefin-based aqueous adhesive (CHEMIPEARL EVS6500N, Mitsui Chemicals, Inc.) to a polypropylene-based adhesive, and was applied in the same manner as in Example 1. The application amount per one surface was 12 mg/cm$^2$ at the time when the drying was completed. The pressing step was carried out such that the electrode mix layer had a density of 3 g/cm$^3$. The heat insulating layer was applied in the same manner as in Example 1.

Example 7

<Preparation of Aqueous Positive Electrode Plate for Lithium Battery, LiNi$_{0.4}$Mn$_{0.4}$Co$_{0.2}$O$_2$, SBR Adhesive>

A mix slurry was prepared in the same manner as in Example 1, except that the adhesive was changed from the olefin-based aqueous adhesive (CHEMIPEARL EVS6500N, Mitsui Chemicals, Inc.) to SBR (styrene-butadiene latex), and was applied in the same manner as in Example 1. The application amount per one surface was 12 mg/cm$^2$ at the time when the drying was completed. The pressing step was carried out such that the electrode mix layer had a density of 3 g/cm$^3$. The heat insulating layer was applied in the same manner as in Example 1.

Example 8

<Preparation of Aqueous Positive Electrode Plate for Lithium Battery, LiNi$_{0.4}$Mn$_{0.4}$Co$_{0.2}$O$_2$, Acrylic Adhesive>

A mix slurry was prepared in the same manner as in Example 1, except that the adhesive was changed from the olefin-based aqueous adhesive (CHEMIPEARL EVS 6500N, Mitsui Chemicals, Inc.) to an acrylic adhesive (styrene-methacrylic acid), and was applied in the same manner as in Example 1. The application amount per one surface was 12 mg/cm$^2$ at the time when the drying was completed. The pressing step was carried out such that the electrode mix layer had a density of 3 g/cm$^3$. The heat insulating layer was applied in the same manner as in Example 1.

Example 9

<Preparation of Aqueous Positive Electrode Plate for Lithium Battery, LiNi$_{0.4}$Mn$_{0.4}$Co$_{0.2}$O$_2$, Thickening Agent: Polyvinyl Alcohol>

A mix slurry was prepared in the same manner as in Example 1, except that the thickening agent was changed from carboxymethyl cellulose to polyvinyl alcohol (KL-318 manufactured by KURARAY CO., LTD.), and was applied in the same manner as in Example 1. The application amount per one surface was 12 mg/cm$^2$ at the time when the drying was completed. The pressing step was carried out such that the electrode mix layer had a density of 3 g/cm$^3$. The heat insulating layer was applied in the same manner as in Example 1.

Example 10

<Preparation of Water/Organic Solvent Mixture-Based Positive Electrode Plate for Lithium Battery, LiNi$_{0.4}$Mn$_{0.4}$Co$_{0.2}$O$_2$>

A mix slurry was prepared in the same manner as in Example 1. To water as a solvent, isopropyl alcohol was added by 10%. The application was carried out in the same manner as in Example 1. The application amount per one surface was 12 mg/cm$^2$ at the time when the drying was completed. The pressing step was carried out such that the electrode mix layer had a density of 3 g/cm$^3$. The heat insulating layer was applied in the same manner as in Example 1.

Example 11

<Preparation of Al$_2$O$_3$-Containing Heat Insulating Layer>

100 parts by weight of Al$_2$O$_3$; 4.44 parts by weight of in terms of solid content of PVDF (KF polymer W1300, manufactured by KUREHA CORPORATION) dissolved in N-methylpyrrolidone; and a solution synthesized from N,N'-bismaleimide-4,4'-diphenylmethane and barbituric acid that were dissolved in N-methylpyrrolidone, were added. By using a planetary mixer and a high-speed stirring machine (manufactured by INOUE MFG., INC.), a slurry was prepared. Further, for viscosity control, N-methylpyrrolidone was added to control the dispersion. The slurry was applied on the positive electrode plate of Reference Example 1-1.

Comparative Example 11

The slurry prepared in the same manner as in Example 11 was applied on the positive electrode plate of Reference Example 1-2.

Example 12

<Preparation of Li$_2$CO$_3$-Containing Heat Insulating Layer>

100 parts by weight of Li$_2$CO$_3$; 4.44 parts by weight in terms of solid content of PVDF (KF polymer W1300, manufactured by KUREHA CORPORATION) dissolved in N-methylpyrrolidone; and a solution synthesized from N,N'-bismaleimide-4,4'-diphenylmethane and barbituric acid that were dissolved in N-methylpyrrolidone, were added. By using a planetary mixer and a high-speed stirring machine (manufactured by INOUE MFG., INC.), a slurry was prepared. Further, for viscosity control, N-methylpyrrolidone was added to control the dispersion. The slurry was applied on the positive electrode plate of Reference Example 1-1.

Comparative Example 12

The slurry prepared in the same manner as in Example 12 was applied on the positive electrode plate of Reference Example 1-2.

[Evaluation]

<Evaluation of Positive Electrode Plate after Coated with Heat Insulating Layer>

A thickness of the positive electrode plate before coated with the heat insulating layer and a thickness of the positive electrode plate after coated with the heat insulating layer were measured to study the degree of swelling. Based on results obtained and by "Example divided by corresponding Reference Example", standardized values were given. The results are shown in Table 1, where the smaller a value is, the less the swelling is.

<Evaluation of Electrode Adhesion>

The positive electrode plate obtained was used. The electrode plate after coated with the heat insulating layer was cut to have a size of 1.5 cm×2 cm, which was then attached on a glass preparation by using an instantaneous adhesive agent to fix the electrode, whereby a sample for evaluation was given. The sample for evaluation was cut between the electrode mix layer and the positive electrode plate, with a coating-film peel strength measuring instrument SAICAS DN20 (manufactured by DAIPLA WINTES CO., LTD.), at a horizontal rate of 2 μm/sec. As a result, a force in the horizontal direction necessary for the cutting was measured and defined as a peel strength (kN/m) of the electrode mix layer. Based on results obtained and by "Example divided by corresponding Reference Example", standardized values were given. The results are shown in Table 1, where the larger a value is, the larger an adhesive strength is.

TABLE 1

|  | Thickness (standardized value) | Cut strength (standardized value) |
|---|---|---|
| Example 1 | 0.97 | 1.00 |
| Comparative Example 1 | 1.08 | 0.87 |
| Example 2 | 1.03 | 1.32 |
| Comparative Example 2 | 1.12 | 0.84 |
| Example 3 | 0.99 | 1.07 |
| Comparative Example 3 | 1.05 | 0.99 |
| Example 4 | 1.01 | 0.94 |
| Comparative Example 4 | 1.14 | 0.76 |
| Example 5 | 1.04 | 1.03 |
| Comparative Example 5 | Peeling occurred | 0.60 |
| Example 6 | 0.99 | 1.27 |
| Example 7 | 1.02 | 1.27 |
| Example 8 | 0.89 | 1.07 |
| Example 9 | 1.01 | 0.94 |
| Example 10 | 1.01 | 1.01 |
| Example 11 | 1.05 | 0.72 |
| Comparative Example 11 | 1.10 | 0.74 |
| Example 12 | 1.09 | 0.69 |
| Comparative Example 12 | 1.12 | 0.49 |

[Preparation of Lithium Battery]
<Preparation of Negative Electrode Plate for Lithium Battery>
(Preparation of Mix Slurry)

94 parts by weight of mesophase graphite powder; 1 part by weight of conductive carbon black (manufactured by TIMCAL Super P); and 5 parts by weight in terms of solid content of PVDF dissolved in N-methylpyrrolidone, were added. By using a planetary mixer and a high-speed stirring machine (manufactured by INOUE MFG., INC.), a mix slurry was prepared. Further, for viscosity control, N-methylpyrrolidone was added to control the dispersion.

(Application onto Negative Electrode Plate)

The mix slurry obtained above was used for its application onto a collector for negative electrode plate, and dried, with the coating device used for the positive electrode plate. In the three drying zones, the slurry was dried at 100° C., 110° C. and 120° C. respectively. The wind velocity was set at 12 m/s. On both surfaces of a copper foil having a thickness of 10 μm serving as the collector for negative electrode plate, the mix slurry was applied and dried. As a result, a precursor electrode for negative electrode plate was given. The application amount per one surface was 11.3 mg/cm$^2$ at the time when the drying was completed.

(Pressing Step)

The electrode prepared (i.e., the precursor electrode for negative electrode plate) was rolled with a roll pressing machine, to give a negative electrode plate. The treatment was carried out such that the electrode mix layer had a density of 1.5 g/cm$^3$.

<Preparation of Non-Aqueous Electrolyte Solution for Lithium Battery>

A non-aqueous solvent was used which had been given by mixing ethylene carbonate (EC) and methyl ethyl carbonate (MEC) at a ratio of EC:MEC=1:1 (volume ratio). Then, LiPF$_6$ serving as an electrolyte was dissolved therein, and in such a manner that the concentration of the electrolyte was 1.0 mol/L, a non-aqueous electrolyte solution was prepared.

<Preparation of Coin-Shaped Lithium Battery>

As a negative electrode plate for a coin-shaped lithium battery, the above-mentioned negative electrode plate was stamped out to have a disk shape of 14 mm in diameter, giving a coin-shaped negative electrode plate. The positive electrode plate obtained was stamped out to have a disk shape of 13.5 mm in diameter, giving a coin-shaped positive electrode plate. The coin-shaped negative electrode plate, the coin-shaped positive electrode plate, and a separator of a microporous polyethylene film (manufactured by Celgard) were laminated in the order of the negative electrode plate, the separator and the positive electrode plate in a negative electrode can of a stainless 2032-size battery can. Thereafter, to the separator, 0.04 ml of the non-aqueous electrolyte solution was poured, and on that laminate, an aluminum plate (thickness: 1.2 mm, diameter: 16 mm) and a spring were superposed. Finally, via a gasket made of polypropylene, a positive electrode can of the battery was placed, and a can lid was caulked in order for the battery to be hermetic therein, to thereby give a coin-shaped lithium battery having a diameter of 20 mm and a height of 3.2 mm.

<Evaluation of Battery Properties>

The coin-shaped lithium battery prepared was charged at a constant current of 0.1 C until a predetermined voltage was reached, and thereafter the battery was charged until the current reached 0.05 C. A charge capacity at this time was defined as an initial charge capacity (mAh/g).

Then, the battery was discharged at a constant current of 0.1 C until a predetermined voltage was reached. A discharge capacity at this time was defined as an initial discharge capacity (mAh/g).

The charging-discharging set as described above was repeated 500 cycles, and a capacity after the 500th cycle (%) relative to the initial battery capacity was evaluated. Based on the initial discharge capacity and results of the cycle tests that were obtained in the foregoing and by "Example divided by corresponding Reference Example", standardized values were given. Results are shown in Table 2.

TABLE 2

|  | Discharge capacity (standardized value) | Cycle properties (%, 500 times) |
|---|---|---|
| Example 1 | 1.01 | 88.2 |
| Comparative Example 1 | 0.99 | 87.1 |
| Example 2 | 1.07 | 87.5 |
| Comparative Example 2 | 1.02 | 86.3 |
| Example 3 | 0.98 | 86.1 |
| Comparative Example 3 | 0.93 | 84.6 |
| Example 5 | 1.00 | 89.2 |
| Comparative Example 5 | — | — |
| Example 6 | 1.01 | 88.5 |
| Example 7 | 0.95 | 87.0 |
| Example 8 | 1.02 | 88.7 |

The coin-shaped lithium battery prepared was fully charged. Thereafter, the battery was dissembled, and the positive electrode plate fully charged was set in a differential scanning calorimetry instrument for measurement. The measurement was conducted at a heating rate of 10° C./min. From a calorific value of a decomposition peak obtained and a temperature which the peak reached, safety performance was evaluated. Results obtained are shown in Table 3, where the lower a calorific value is and the more shifted toward the high temperature side a peak is, the more the safety performance is enhanced.

TABLE 3

|  | Calorific value (J/g) | Exothermic peak (° C.) |
|---|---|---|
| Example 1 | 442 | 342 |
| Reference Example 1-1 | 445 | 331 |
| Comparative Example 1 | 637 | 317 |
| Reference Example 1-2 | 568 | 311 |

Tables 1, 2 and 3 demonstrate that the use of the positive electrode plate containing the aqueous adhesive inhibits the swelling after the application of the heat insulating layer, and prevents decrease in the adhesive strength as well as suppresses decrease in the capacity and in cycle battery properties. It has been also demonstrated that safety performance was enhanced.

The invention claimed is:

1. A lithium battery comprising,
a positive electrode, a negative electrode, a separator and an electrolyte solution,
the positive electrode and/or the negative electrode comprising an electrode plate, a mix layer and a heat insulating layer in this order, wherein the mix layer comprises at least an aqueous adhesive and an active material; the heat insulating layer consisting essentially of a thermal activation material; and at least part of the mix layer is in contact with at least part of the heat insulating layer,
wherein the thermal activation material is a nitrogen-containing polymer that is soluble in an organic solvent and does not swell in water, and
wherein the nitrogen-containing polymer is crosslinkable and comprises at least one kind of component selected from the group consisting of amines, amides, imides, maleimides and imines, and comprises a component derived from a dione selected from the group consisting of barbituric acid, derivatives of barbituric acid, acetylacetone, and derivatives of acetylacetone.

2. The lithium battery according to claim 1, wherein the aqueous adhesive is an adhesive obtained by dispersing or dissolving in water at least one of an olefin resin and an acrylic resin.

3. The lithium battery according to claim 1, wherein the thermal activation material comprises an ethenyl group and an amino group, and wherein a temperature of the crosslinking reaction between the ethenyl group and the amino group is about 100 to 220° C.

4. A process for producing the lithium battery according to claim 1, comprising
a mix layer formation step of applying a mix slurry that contains the active material and the aqueous adhesive onto a surface of the electrode plate to form the mix layer; and
a heat insulating layer formation step of forming the heat insulating layer that consists essentially of the thermal activation material on a surface of the mix layer, the steps being carried out in this order.

5. The process for producing the lithium battery according to claim 4, wherein the heat insulating layer formation step is a step of applying a thermal activation material dissolved in an organic solvent onto the surface of the mix layer to form the heat insulating layer.

* * * * *